United States Patent Office 3,352,797
Patented Nov. 14, 1967

3,352,797
THALLIUM OXIDE GLAZE CONTAINING AN ADDITIVE OF RUTHENIUM OXIDE
Kee Hyong Kim, Niagara Falls, N.Y., assignor to Air Reduction Company, Incorporated, New York, N.Y., a corporation of New York
No Drawing. Filed Jan. 27, 1965, Ser. No. 428,525
14 Claims. (Cl. 252—514)

ABSTRACT OF THE DISCLOSURE

The electrical noise, moisture resistance, and thermal stability characteristics of thallium oxide-glass resistor composition are improved in low resistance formulations of the composition, by adding thereto ruthenium dioxide.

---

This application relates to electrical resistor manufacture and more particularly to conductive compositions suitable for resistors. The term "resistor" is used in a broad sense to designate (1) flat films or coatings applied to a substrate by screen printing, spraying, or by dipping the insulator; (2) applications to cylindrical substrates in spiral fashion or with subsequent mechanical spiraling; and (3) volumetric resistors.

This application is an improvement over my copending patent application Ser. No. 286,202 filed June 7, 1963 (now U.S. Patent 3,238,151) for Resistor Manufacture, which basically discloses thallium oxide, thallous oxide, or thallic oxide dispersed in a glassy matrix to form a novel resistive composition. Said application also discloses that small additions of powdered metal such as gold, silver, platinum, and palladium, in mixture or singly, may be included in the resistive mix to achieve lower resistance values.

While the thallium oxide dispersed in glass composition disclosed in my application Ser. No. 286,202 produces higher resistance value resistors (in the approximate range of 100 ohms/sq. to 10 megohms/sq.) which have excellent physical and electrical qualities, this composition has not been entirely suitable for resistors below 100 ohms/sq., such low resistance value resistors having low moisture resistance and unsatisfactory thermal stability. I have discovered that an addition of ruthenium oxide to the resistor composition disclosed in my prior application substantially improves both the moisture resistance and the thermal stability of resistors formed from such compositions. In addition, the ruthenium additive substantially lowers the current noise of the prior art resistors.

It is therefore an object of this invention to provide an improved resistor. It is a further object of the invention to provide an improved composition for the uses indicated. It is still another object of the invention to provide a novel electric resistor wherein the resistor composition consists essentially of thallium oxide, ruthenium oxide, and small quantities, singly or in mixture, of powdered metal such as gold, silver, palladium, platinum, and others, or oxides of these metals dispersed in glass.

It should be undertood that all percentage of compositions referred to in this application are percentages by weight of the total composition. It should also be understood that when I refer herein to "films" I intend to include deposits such as glaze coatings. The film preferably has a thickness of 0.2 to 2 mils, although my novel composition may be used in coatings of other thicknesses.

The exact nature of this invention, as well as other objects, features, and advantages of the invention, will appear or be pointed out as the description proceeds.

The resistor compounds of this invention may be prepared by mixing finely divided ruthenium oxide, thallium oxide, and glass frit. The finely divided metal oxide-glass frit composition may, if desired, be mixed with a temporary binder to vary the viscosity of the mix for certain types of applications to resistor substrates. A temporary binder is volatilized and all of it is driven off by the firing operation. In addition, inorganic filler material may be added to vary the rigidity of the mix for some applications.

Although the basic resistor composition consists of a mixture of thallium oxide, ruthenium oxide, and a glass frit, silver, gold, platinum, or palladium metals in finely divided form may be added to the mix to vary the resistance value of the composition. These noble metals may also be added to the mix in oxide form. In addition to varying the resistance of the composition, the noble metals added to the mix may have other desirable effects on the composition. For example, silver oxide, when added to the composition in quantities of approximately 0% to 20% may be used to modify such electrical characteristics of the finished resistor as the resistance and the temperature coefficient of resistance.

The glass used in my composition is preferably a lead borosilicate glass as, for example, a glass with constituents in the following ranges:

| Constituent: | Weight percent |
|---|---|
| PbO | 45–85 |
| $B_2O_3$ | 2–19 |
| $SiO_2$ | 7–40 |
| $Al_2O_3$ | 0–3 |
| $Na_2O$ | 0–5 |
| Metal earth oxides (CaO, MgO, SrO, BaO) | 0–10 |
| ZnO | 0–10 |

An example of a commercial glass binder which is suitable for the composition is a lead borosilicate glass sold by Harshaw Company under the label Q–12. In addition to lead borosilicate glass, the glass used in the resistor composition may be any conventional borosilicate or phosphate glass. It has also been found that any of these glasses may be modified by including in the glass up to 10% zinc oxide in the composition thereof as shown by the composition set forth above. The zinc oxide modified glass binder provides certain useful coefficient of thermal expansion characteristics. Consequently, when I speak of glass, glass frit, and glass matrix in this application, I intend to include conventional glass compositions as set forth above which have been modified to contain up to 10% zinc oxide.

A finished resistor may be produced by applying the resistor composition to a ceramic dielectric and firing the same at a temperature that will fuse the composition to the dielectric surface. Further, by the use of suitable filler materials, the composition may be molded into a volumetric resistor. The inorganic resistor composition of this invention consists of thallium oxide, ruthenium oxide, with or without silver, gold, platinum, pallidium, and filler mixed with finely divided glass frit in the following proportions:

| | Suitable Proportions (wt. percent) | Preferred Proportions (wt. percent) |
|---|---|---|
| Thallium oxide | 5.0–90 | 20.0–75 |
| Ruthenium oxide | 0.05–30 | 0.1–20 |
| Silver, gold, platinum, palladium | 0–20 | 0–10 |
| Filler ($TiO_2$, MgO, CaO, SrO, BaO, $Al_2O_3$, $ZrO_2$) | 0–50 | 0–30 |
| Glass | 10.0–90 | 20.0–75 |

As will be seen from the above composition, the essential ingredients are thallium oxide, ruthenium oxide, and glass. As shown by the proportions, noble metals such as silver, gold, platinum, and palladium, or their oxides, may be added to vary the resistance value of the composition, or they may be omitted, and filler materials may be added to change the consistency of the mix for such applications as molding inorganic volumetric resistors, or they may be omitted.

Filler materials may also be used in printed circuit applications where it is necessary to obtain resistance in the higher ranges. For other applications such as flat and cylindrical coatings on rods, or applications by dipping, spraying, or the like, fillers may be used to increase the resistance of the composition and the geometrical rigidity. Examples of suitable inorganic fillers are as set forth in the composition above. Such fillers are to be regarded as diluents in the mixture.

Although the glass is the binder in the composition of this invention after the mix has been fired) a temporary binder can be used in the mix when desired; for example, when a printing process is to be used such as by the screen printing of the composition in a coat upon a printed circuit substrate, the viscosity of the mix can be varied and the resistance can be increased in value with increases in the thickness of the coat or its width, or both, as printed.

The particle size of the ruthenium oxide powder is submicron in diameter and the particle size of the filler is less than —325 meshes.

When temporary binders are employed as in resistance or making the composition for printing, the following organic mixtures are suitable for use as the temporary binder:

| | Weight percent |
|---|---|
| Ethyl cellulose | 0–15 |
| Butyl carbitol | 10–45 |
| Synosol | 20–45 | of the organics used.

The temporary binder is volatilized and all of it is driven off by the firing operation in the formation of the resistor.

Resistor terminals which can consist simply of a noble metal powder that is suspended in a flux painted on in suitable spots and then fired are applied to my resistive composition in different ways, depending upon the form of the resistor. The following example, including the affixing of terminations, is given only to illustrate the differences and not by way of illustration on the terminations or the over-all resistor manufacture.

*Example*

In the manufacture of a printed type resistor, an intimate mix containing the desired proportions of thallium oxide, ruthenium oxide, lead borosilicate glass, and metal powder is ground in a mortar and pestle for 30 to 120 minutes; then about 15 weight percent of ethyl cellulose and butyl alcohol is added to the ground mix and allowed to set for 1 hour and then homogenized in a three roll painter roller for about 10 minutes. The resulting mix is screen printed on a flat ceramic substrate such as forsterite, using a conventional screen printing unit. The size of a standard strip of screen printing is 1.5 mm. wide and 4.5 mm. long, between the terminals. Conductive silver, platinum, or gold terminals which can be obtainable from Du Pont Company can be printed on the substrate before the paste printing, if desired. The printed pastes are then dried in a drying oven at 150° C. for 1 hour; then the printed pastes are fired in a semiautomatic tunnel kiln over a 5 to 60 minute cycle from the temperature 500° C. to 750° C. Table I illustrates the results obtained for the shown compositions which were formed into resistors in accordance with the above example.

The current noise (dbs) was measured using the Quan-Tech Model #2136 resistor noise test set.

TABLE I

| Composition (wt. percent) | Heat Treat. (° C./min.) | Resistance (ohms/sq.) | Noise (dbs) |
|---|---|---|---|
| 36% Tl₂O₃<br>4% RuO₂<br>60% Glass | 560/11 | 55 | —21.4 |
| 15% Tl₂O₃<br>18% RuO₂<br>7% Ag<br>60% Glass | 530/11 | 50 | —36.3 |
| 40% Tl₂O₃<br>5% RuO₂<br>5% Ag<br>50% Glass | 560/11 | 126 | —19.7 |

As can be seen from Table I, resistors formed by the composition of this invention have a very low noise level. For purposes of comparison with the resistors of my copending patent application Ser. No. 286,202, Table II below illustrates the shown resistor compositions without ruthenium oxide and certain of the electrical characteristics of the composition.

TABLE II

| Composition (wt. percent) | Heat Treat. (° C./min.) | Resistance (ohms/sq.) | Noise (dbs) |
|---|---|---|---|
| 40% Tl₂O₃<br>60% Glass | 540/11 | 60.9 | +2.6 |
| 50% Tl₂O₃<br>50% Glass | 540/11 | 7.43 | +2.1 |
| 40% Tl₂O₃<br>10% Ag<br>50% Glass | 560/11 | 161.0 | +8.8 |

Tables I and II clearly indicate the improvement in noise level created when ruthenium oxide is added to the inorganic composition mix. For example, it will be noted that the noise level for a resistive composition mix of 40% thallium oxide and 60% glass was found to be +2.6 dbs, whereas 36% thallium oxide, 4% ruthenium oxide, and 60% glass result in the noise level being reduced to —21.4 dbs. Other percentages of ruthenium oxide than those specifically shown will produce similar effects. In addition, the ruthenium oxide modified resistors increased the moisture resistance and improved the thermal stability characteristics of the resistor.

As previously pointed out, the preferred range of constituents of the resistor composition from the standpoint of desirable resistor characteristics is basically 20% to 75% thallium oxide, 0.1% to 20% ruthenium oxide, and the balance glass. Various fillers or metal powders may obviously be added for reasons as pointed out hereinabove. Due to the high cost of ruthenium oxide in comparison to the remaining basic constituents of the resistor composition, i.e. thallium oxide and glass, it is desirable to use as small an amount of ruthenium oxide as possible and at the same time maintain the desired resistor characteristics. I have found that a resistor composition consisting of 65% to 75% thallium oxide, 0.1% to 5% ruthenium oxide, and balance glass, can be very satisfactory in producing resistors which have low current noise, high moisture resistance, and good thermal stability.

It should be understood that my novel resistor composition and finished resistor can be made from methods other than disclosed herein; for example, the finished resistor can be made from the methods disclosed in my above-identified copending patent application, including the recrystallization process, by merely changing the proportions of the constituents disclosed in the copending application and adding ruthenium oxide to the composition.

I have disclosed that the resistive composition of my copending patent application Serial No. 286,202 may be greatly improved for low resistance value resistors by adding ruthenium oxide to the composition. It should be pointed out that while the composition of the present disclosure is particularly useful for low resistance value resistors, it is also equally useful for high resistance value resistors. High value resistance compositions may be made by simply reducing the amount of conductive metal and increasing the amount of glass or other filler in the resistor mix.

Obviously many modifications and variations of the invention are possible in the light of the above teachings. It is therefore to be understood that within the scope of the appended claims the invention may be practiced otherwise than as specifically disclosed.

I claim:

1. A conductive composition suitable for electric resistors comprising a mixture of thallium oxide and ruthenium dioxide intimately dispersed in a glassy matrix, the glass comprising said matrix being selected from the group consisting of borosilicate and phosphate glasses.

2. A conductive composition as in claim 1 characterized by the proportions of thallium oxide, ruthenium dioxide, and glassy matrix being within the range 5% to 90% thallium oxide, 0.05% to 80% ruthenium dioxide, and 90% to 10% glassy matrix, the glass comprising said matrix being selected from the group consisting of borosilicate and phosphate glasses.

3. A resistor composition as in claim 1 characterized by the proportions of the essential constituents of the composition being 20% to 75% thallium oxide, 0.1% to 20% ruthenium dioxide, and 20% to 75% glassy matrix, the glass comprising said matrix being selected from the group consisting of borosilicate and phosphate glasses.

4. A resistor composition as in claim 1 characterized by the proportions of the essential ingredients being 65% to 75% thallium oxide, 0.1% to 5% ruthenium dioxide, and 34.9% to 20% glassy matrix, the glass comprising said matrix being selected from the group consisting of borosilicate and phosphate glasses.

5. A resistor composition comprising 5% to 90% thallium oxide, 0.05% to 80% ruthenium dioxide, 0% to 20% finely divided metal taken from the group consisting of silver, gold, platinum, and palladium, and 10% to 90% glass frit selected from the group consisting of borosilicate and phosphate glasses.

6. A resistor composition as defined in claim 5 in combination with a temporary liquid binder to form a paste with said composition components.

7. A resistor composition consisting essentially of 20% to 75% thallium oxide, 0.1% to 20% ruthenium dioxide, 0% to 10% finely divided metal taken from the group consisting of silver, gold, platinum, and palladium, and 20% to 75% glass frit selected from the group consisting of borosilicate and phosphate glasses.

8. A resistor composition as defined in claim 7 in combination with sufficient temporary liquid binder to form a paste with said composition components.

9. A resistor composition consisting essentially of 5% to 95% thallium oxide; 0.05% to 80% ruthenium dioxide; 0% to 20% finely divided metal taken from the group consisting of silver, gold, platinum, and palladium; 0% to 50% filler taken from the group consisting of $TiO_2$, MgO, CaO, SrO, BaO, $Al_2O_3$, and $ZrO_2$; and 10% to 90% glass frit selected from the group consisting of borosilicate and phosphate glasses.

10. A resistor composition comprising 20% to 75% thallium oxide; 0.1% to 20% ruthenium dioxide; 0% to 30% filler taken from the group consisting of $TiO_2$, MgO, CaO, SrO, BaO, $Al_2O_3$, and $ZrO_2$; and 0% to 10% finely divided metal taken from the group consisting of silver, gold, palladium, and platinum; and 20% to 75% glass frit selected from the group consisting of borosilicate and phosphate glasses.

11. An electrical resistor comprising a ceramic dielectric containing on the surface thereof an inorganic resistor element comprising components in the proportions of 5% to 90% thallium oxide; 0.05% to 80% ruthenium dioxide; 0% to 50% filler taken from the group consisting of $TiO_2$, MgO, CaO, SrO, BaO, $Al_2O_3$, and $ZrO_2$; 0% to 20% finely divided metal powder taken from the group consisting of silver, gold, platinum, and palladium; a total of 10% to 90% of said components, said components being embedded in a glassy matrix, the glass comprising said matrix being selected from the group consisting of borosilicate and phosphate glasses.

12. An electrical resistor comprising a ceramic dielectric containing on the surface thereof an inorganic resistor element comprising components in the proportions 20% to 75% thallium oxide; 0.1% to 20% ruthenium dioxides; 0% to 30% filler taken from the group consisting of $TiO_2$, MgO, CaO, SrO, BaO, $Al_2O_3$, and $ZrO_2$; 0% to 10% finely divided metal taken from the group consisting of silver, gold, platinum, and palladium; a total of 20% to 75% of said components; said components being embedded in a glassy matrix which comprises 80% to 25% of the resistor element, the glass comprising said matrix being selected from the group consisting of borosilicate and phosphate glasses.

13. An electrical resistor comprising a ceramic dielectric containing on the surface thereof an inorganic resistor element consisting essentially of components in the proportions 65% to 75% thallium oxide; 0.1% to 5% ruthenium dioxide; 0% to 10% finely divided metal taken from the group consisting of silver, gold, platinum, and palladium; 0% to 12% zinc oxide; a total of 65.1% to 80% of said components, said components being embedded in a glassy matrix which comprises 20% to 34.9% of said resistor element, the glass comprising said matrix being selected from the group consisting of borosilicate and phosphate glasses.

14. A composition according to claim 1 wherein said glass comprising said matrix is a lead borosilicate glass.

References Cited
UNITED STATES PATENTS

| | | | |
|---|---|---|---|
| 2,081,894 | 5/1937 | Meyer et al. | 252—518 |
| 3,154,503 | 10/1964 | Janakirama-Rao | 252—514 |
| 3,252,831 | 5/1966 | Ragen | 252—514 |

LEON D. ROSDOL, *Primary Examiner.*

J. D. WELSH, *Assistant Examiner.*